INVENTORS
JOSEPH C. BOLTINGHOUSE
JAMES L. ATKINSON
BY
ATTORNEY

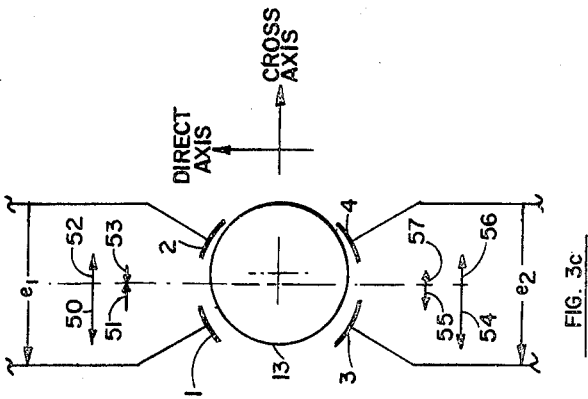
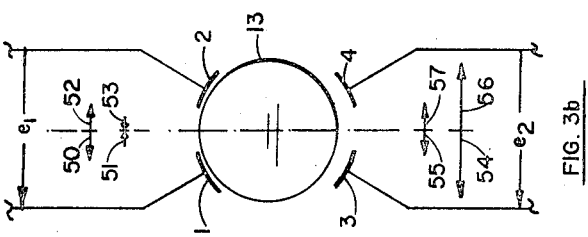
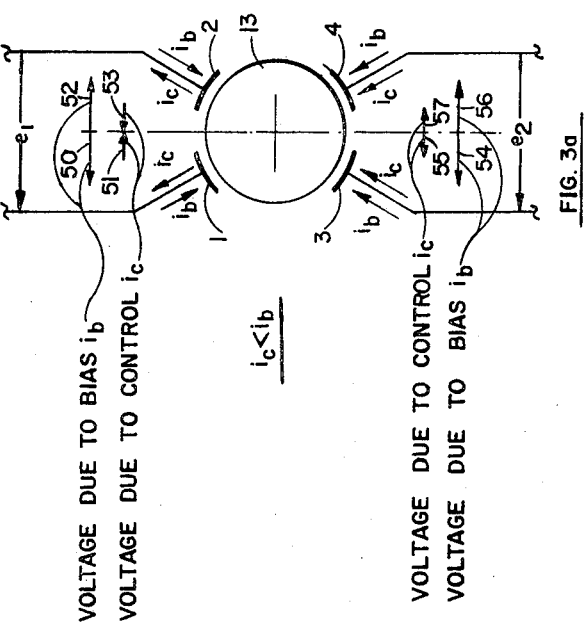

INVENTORS
JOSEPH C. BOLTINGHOUSE
JAMES L. ATKINSON

UnitedStates Patent Office 3,482,455
Patented Dec. 9, 1969

3,482,455
ELECTROSTATIC LEVITATION CONTROL SYSTEM
Joseph C. Boltinghouse, Whittier, and James L. Atkinson, La Mirada, Calif., assignors to North American Rockwell Corporation, a corporation of Delaware
Filed May 9, 1967, Ser. No. 637,124
Int. Cl. G01c 19/28
U.S. Cl. 74—5.6                          15 Claims

ABSTRACT OF THE DISCLOSURE

A control system for electrostatically supporting a spherical rotor with respect to three mutally perpendicular axes in which six pairs of electrodes are arranged symmetrically around the rotor with two pairs of electrodes arranged along each of the axes and on opposite sides of the rotor to levitate the rotor with respect to that axis. The combination of the location and shape of the electrodes together with the arrangement of a pair of balanced transformers for each axis provides a system in which a pickoff signal is derived from each two pairs of electrodes which varies as a function of the position of the rotor along an axis which is perpendicular to the respective axis of levitation. The pickoff signal is insensitive to motion of the rotor along the other two axes.

BACKGROUND OF THE INVENTION

Field of the invention

The present invention relates to an electrostatic bearing for a gyroscope rotor and, more particularly, to an electrostatic gyroscope rotor levitation control system in which a plurality of cavity electrodes provide the dual function of forcing and position sensing and in which the control and sensing signals are isolated to a greater extent than heretofore obtainable.

Description of the prior art

An electrostatic gyroscope is a free rotor type of gyroscope in which the rotor support forces are derived from an electric field. The rotor is generally an aluminum or beryllium sphere which may be either solid or hollow. The electrostatic support means consists generally of a plurality of pairs of spherical segment electrodes or plates dispersed about the rotor.

Common to every active levitation control system in which the cavity electrodes provide the dual function of electrostatic forcing and capacitance position sensing is the problem of separation, or isolation, of the control and sensing signals. When sufficient separation is not achieved, there is established an undesirable feedback loop which limits the maximum gain of the levitation electronics. In a practical sense, it is in this manner that the fundamental rotor stiffness and dynamic response is limited. Furthermore, when insufficient separation of control and sensing signals is present, a deteriorated position pickoff signal results which cannot be utilized for acceleration measurements and cannot be utilized for spin axis mass unbalance pickoff measurements.

Prior means for separting control and sensing signals fall into two general categories, mechanical and electronic. Mechanical means for separation simply assign separate electrode or plate sets for each of the two functions: control and sensing. Although excellent separation can be expected from this method, there are two strong disadvantages. The first is in the fabrication of the plate sets. Care must be exercised so that the control and sensing axes are colinear or else external electrical coordinate conversion must be provided and the attendant reduction in performance accepted. Additionally, the increased number of electrical feed-throughs pose the problem of vacuum seal and electrical contact reliability. The second major disadvantage is the reduction in control plate area. This reduction lowers the maximum support force capability assuming no change in the size and mass of the rotor.

Prior electrical means for separation are varied and somewhat useful. Each means, however, suffers in comparison to the concept disclosed herein. A straight-forward prior means employs two carrier frequencies and relies on frequency separation by filtering or demodulation. A single frequency scheme uses phase discrimination. A unidirectional means depends upon a wide frequency band impedance match and employs signal cancellation over this band.

Although each of the above mentioned systems for electrostatically supporting a gyroscope rotor provides some degree of separation between control and sensing signals, none are operative to provide the degree of separation achieved with the present invention.

SUMMARY OF THE INVENTION

According to the present invention, there is provided a leviation control system which employs cross-axis sensing and direct-axis forcing to maximize the separation between the position sensing signal and the control or forcing signal. The electrical bearing for the present electrostatic gyroscope consists of twelve electrodes or plates arranged to fit around the surface of the rotor with a small uniform clearance gap. Two pairs of plates are assigned to each of three mutally orthogonal axes. The present levitation control system employs a capacitance bridge to sense the position of the rotor with respect to the center of the bearing. The position information generates control currents in the rotor-plate capacitors in such a manner that the rotor is maintained by electrostatic forces in stable equilibrium near center. Along each axis, a pair of balanced transformers are arranged for rotor position pickoff, control current injection and constant bias current feed. The combination of the location and shape of the plates together with the arrangement of the balanced transformers provides a system in which a pickoff signal is derived from each two pairs of plates which varies as a function of the position of the rotor along an axis which is perpendicular to the respective axis of levitation and which is insensitive to motion of the rotor along the other two axes. The three control loops are closed by the insertion of an electronic circuit between the pickoff signal lines and the control current transformers.

OBJECTS

It is therefore an object of the present invention to provide an electrostatic levitation control system for a gyroscope rotor in which the cavity electrodes provide the dual function of electrostatic forcing and capacitance position sensing.

It is a further object of the present invention to provide an electrostatic leviation control system for a gyroscope rotor in which a high degree of separation is achieved between the control and sensing signals.

It is a still further object of the present invention to provide an electrostatic levitation control system for a gyroscope rotor in which the sensing axis is perpendicular to the axis of levitation.

It is another object of the present invention to provide an electrostatic levitation control system for a gyroscope rotor which employs a novel configuration of cavity electrodes for electrostatic forcing and capacitance position sensing.

It is still another object of the present invention to provide an electrostatic levitation control system for a gyroscope rotor in which a plurality of balanced transformers perform the functions of position signal pickoff, control current injection and constant bias current feed.

Still other objects, features and attendant advantages of the present invention will become apparent to those skilled in the art from a reading of the following detailed description of a preferred embodiment constructed in accordance therewith, taken in conjunction with the accompanying drawings, wherein:

BRIEF DESCRIPTION OF THE DRAWINGS

FIGURES 3a–3c show the manner in which the voltages due to the control and bias currents vary in the control circuits as a function of the position of the rotor;

DESCRIPTION OF THE PREFERRED EMBODIMENTS

Figure 1:
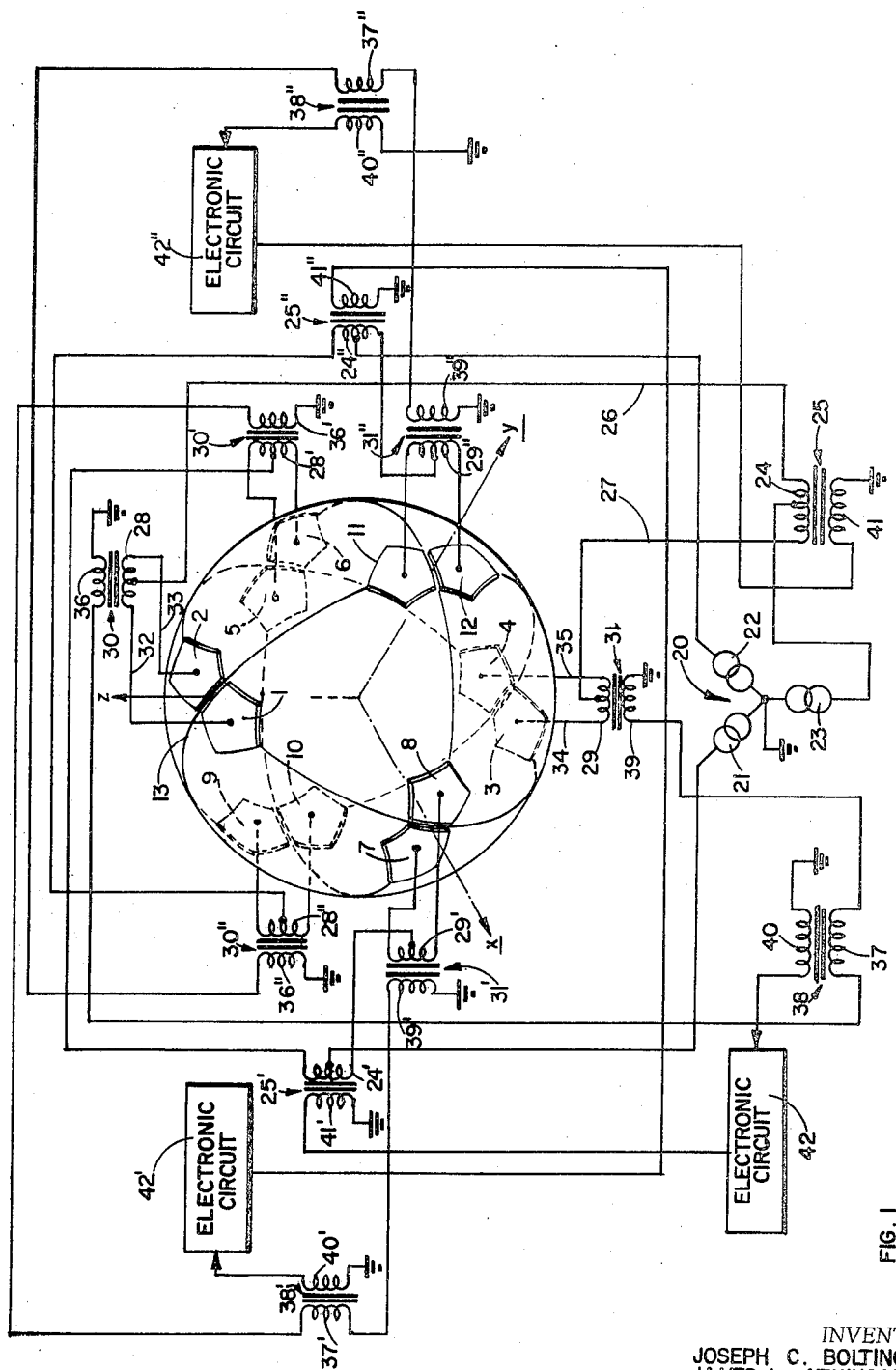
FIGURE 1 is a schematic diagram of the entire three axis leviation control system showing the arrangement of the plates and the interconnections between the three axes.

Referring now to the drawings and, more particularly, to FIGURE 1 thereof, there is shown a schematic diagram of the three axis levitation control system of the present invention. The electrical bearing for this gyroscope consists of twelve electrodes or plates 1–12 supported on an insulating structure (not shown) and arranged to fit around the surface of a ball rotor 13 with a small uniform clearance gap. As can be seen from FIGURE 1, the plates are arranged in pairs and two plate pairs are assigned to each of the three mutually orthogonal axes $x$, $y$ and $z$. Along the $z$ axis, for example, plates 1 and 2 define a first pair and plates 3 and 4 define a second pair. Plates 1 and 2 are symmetrical with respect to each other about a plane defined by the $y$, $z$ axes. In addition, each of plates 1 and 2 is symmetrical about a plane defined by the $x$, $z$ axes. The construction of plates 3–12 is the same with respect to their respective axes as are plates 1 and 2 with respect to the $z$ axis.

The rotor-plate capacitance of the $z$ axis plates 1–4, for example, varies as rotor 13 moves in the $z$ direction. The capacitance of the plates also varies as motor 13 moves in the $x$ direction because plates 1–4 "wrap around" toward the $x$ axis. Limited motion in the $y$ direction, however, causes negligible (second order) changes in the capacitance of $z$ axis plates 1–4 since wrap around is toward both the $+y$ axis and $-y$ axis. In the present case, the $z$ axis is referred to as the direct axis and the $x$ axis as the cross axis.

The levitation control system employs a capacitance bridge to sense the position of rotor 13 with respect to the center of the bearing. According to predetermined control law, the position information generates control currents in the rotor-plate capacitors in such a manner that the ball is maintained by electrostatic forces in stable equilibrium near center.

From the point of view of classical automatic control theory, the present approach uses an A.C. carrier system in which the load, in this case rotor 13, is unable to follow the carrier frequency and thus behaves as a demodulator responsive only to the carrier envelope or modulation. The carrier system is unique, however, in that the carrier generator is preferably a three-phase y-connected current source 20 with one phase controlling each spatial degree of freedom of rotor 13. Since the center of the y-connected generator is grounded, rotor 13 is at virtual ground. Therefore, in diagrams rotor 13 can be shown connected to ground.

Three-phase source 20 provides the carrier signal for supporting rotor 13. Source 20 preferably consists of three y-connected constant current sources 21, 22 and 23 with each current generator controlling one spatial degree of freedom of rotor 13. For example, and as shown more clearly in FIGURE 2, constant current source 23 provides a constant current, $4i_b$, to the center tap of a winding 24 of a first balanced transformer 25. A pair of equal currents, $2i_b$, are derived at the end terminals of winding 24 and are applied via a pair of leads 26 and 27, respectively, to the center taps of a pair of windings 28 and 29 of a pair of balanced transformers 30 and 31, respectively. Winding 28 of transformer 30 provides, at its end terminals, a pair of equal currents, $i_b$, which go, via leads 32 and 33, to the first pair of $z$ axis plates 1 and 2. Similarly, winding 29 provides, at its end terminals, a pair of equal currents, $i_b$, which go, via leads 34 and 35, to the second pair of $z$ axis plates 3 and 4. The currents into plates 1, 2, 3 and 4 go, via rotor 13 which is at virtual ground, back to source 23. Balanced transformer 30 has a second winding 36 which provides a pick-off voltage to a first end terminal of a winding 37 of a fourth balanced transformer 38. Similarly, balanced transformer 31 has a second winding 39 which provides a pickoff voltage in an additive fashion to the other end terminal of winding 37 of balanced transformer 38. Another winding 40 of balanced transformer 38 provides a pickoff signal which is a function of motion along the $x$ axis. Balanced transformer 25 has a second winding 41 for receiving a control signal which is additively combined with the signal from current source 23 so as to effect a forcing signal to the $z$ axis of rotor 13.

The same circuitry is provided for the $x$ and $y$ axis of the levitation control system shown in FIGURE 1. Therefore, the same number has been given to the components along the $x$ and $y$ axis, the only difference being that a prime is associated with the components for the $x$ axis and a double prime is associated with the components for the $y$ axis. The position pickoff signal from winding 40 of balanced transformer 38 is applied to an electronic circuit 42 whose function will be described more fully hereinafter. The output of circuit 42 is applied to winding 41' of balanced transformer 35' so as to be additively combined with the signal from current generator 21 to provide a forcing signal to the $x$ axis as a function of the sensed deviation from the $z$ axis plates.

Figure 2:
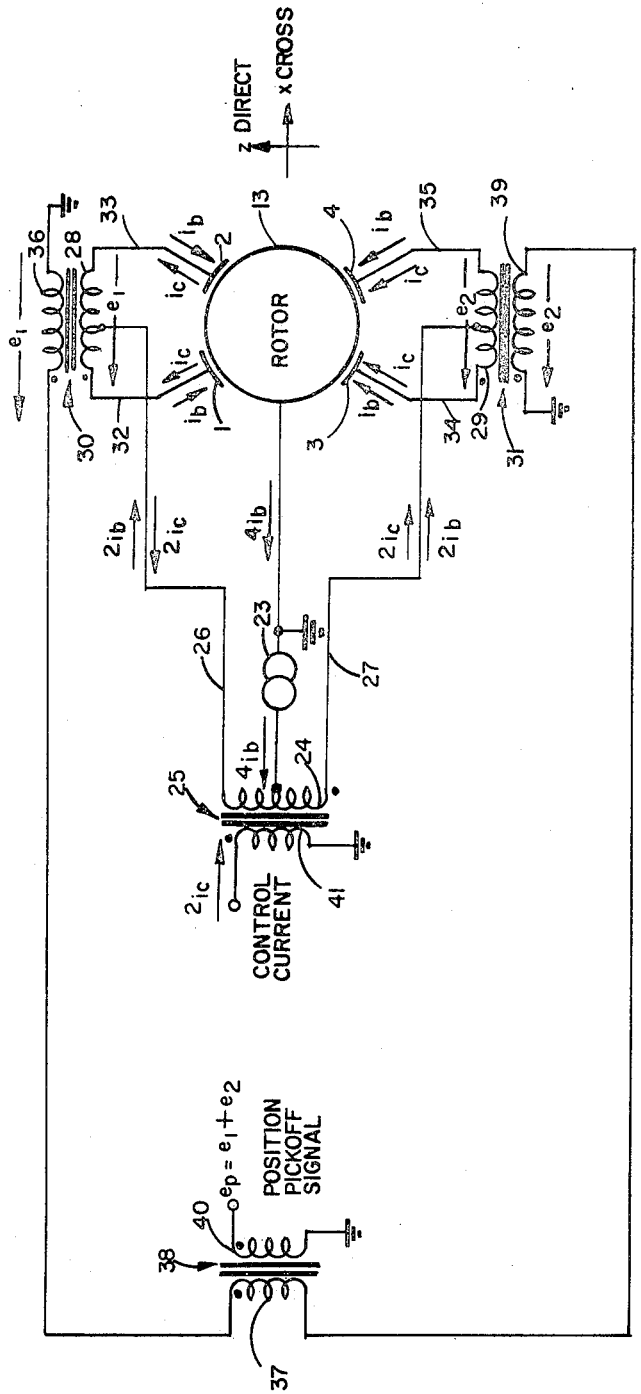
FIGURE 2 is a schematic diagram showing the operation of direct-axis forcing and cross-axis sensing for a single axis.

The manner in which the present invention is operative to provide cross-axis sensing and direct-axis forcing to maximize the separation between the position sensing signal and the control or forcing signal may be better understood with reference to FIGURE 2 which shows a simplified diagram of the $z$ axis circuitry. Since the $z$ axis circuitry is the same as that for the $x$ and $y$ axes, a description thereof will suffice to explain the operation of the entire system. The simplified diagram of FIGURE 2 assumes rotor 13 motion is restricted to the $x$, $z$ plane. In this case, the $z$ axis is the direct axis and the $x$ axis is the cross axis.

FIGURE 2 shows how balanced transformers 30 and 31 are arranged for rotor position pickoff, control current injection and constant bias current feed. To develop a more fundamental equivalent circuit, it is necessary only to examine the behavior of the ideal balanced transformer. A constant current into the center tap leaves the two end terminals as constant and equal current sources independent of load. The untapped secondary either acts as a differential amplifier reading the potential difference across the load or, when driven by a current source, it causes load current to leave one end terminal and enter the other. These three characteristics are in evidence in FIGURE 2. It should be noted that the pickoff signal $e_p$ at winding 40 is equal to the sum of the voltages $e_1$ and $e_2$ across windings 36 and 39 of balanced transformers 30 and 31, respectively. It should also be noted that the bias current $i_b$ and the control current $i_c$ in the load capacitors remain constant in spite of load changes due to position changes. A simplified diagram showing the manner in which the voltages change as a function of the motion of rotor 13 along the direct and cross axes is shown in FIGURES 3a–3c. In all three cases, the currents are assumed constant.

In FIGURE 3a, rotor 13 is shown locked in a center position in which the load reactances are all equal. The voltage $e_{i_b}$ due to bias current $i_b$ in the upper left capacitor formed by plate 1 and rotor 13 is represented by an arrow 50 which is larger than an arrow 51 representing the voltage $e_{i_c}$ due to control current $i_c$ which, for present purposes, is assumed smaller than $i_b$. The voltage arrows associated with the other three capacitors are also shown. More specifically, voltage arrows 52 and 53 represent the voltages at plate 2 due to bias current $i_b$ and control current $i_c$, respectively, voltage arrows 54 and 55 represent the voltages at plate 3 due to bias current $i_b$ and control current $i_c$, respectively, and voltage arrows 56 and 57 represent the voltages at plate 4 due to bias current $i_b$ and control current $i_c$, respectively.

Because the bias voltages are equal and the control voltages are equal, $e_1$ and $e_2$, the voltages, respectively, between plates 1 and 2 and plates 3 and 4 are zero and consequentially the pickoff voltage $e_p$ is zero. It is significant to note that the pickoff voltage $e_p$ is zero even in the presence of a control current $i_c$. The control current is a carrier current exactly out of phase with the bias current in the upper plates and exactly in phase with the bias current in the lower plates. As shown, there is a net electrostatic force directed downwardly due to $i_c$.

Referring to FIGURE 3b, rotor 13 is held above center in the positive $z$ direction. The reactance of plates 1 and 2 increases in the same direction and by the same amount and the reactance of plates 3 and 4 decreases in the same direction and by the same amount. Therefore, since the upper reactances are equal and the lower reactances are equal, the indicated voltages on each plate result in $e_1$ and $e_2$ and the pickoff voltage being zero once again.

Referring to FIGURE 3c, there is shown the case where rotor 13 is moved to the right along the cross axis in the positive $x$ direction. Since the control currents are going into plates 3 and 4 and exiting from plates 1 and 2, even though the voltages due to the control currents change in the case illustrated in FIGURE 3c, the voltages due to control current $i_c$ cancel at $e_p$ when $e_1$ is added to $e_2$. However, the voltages due to bias current $i_b$ induced between plates 1, 2 and 3, 4 do not cancel when added at $e_p$. As a result, the voltage present at $e_1+e_2$ is proportional to the cross-axis displacement.

In summary, it can be seen from an inspection of FIGURES 2 and 3 that the position pickoff signal $e_p$ is completely independent of both the bias current and the control current and is also independent of motion of rotor 13 along the direct axis. However, in the presence of motion along the cross axis, a signal is generated which is linearly proportional to the amount of rotor displacement.

Figure 4:
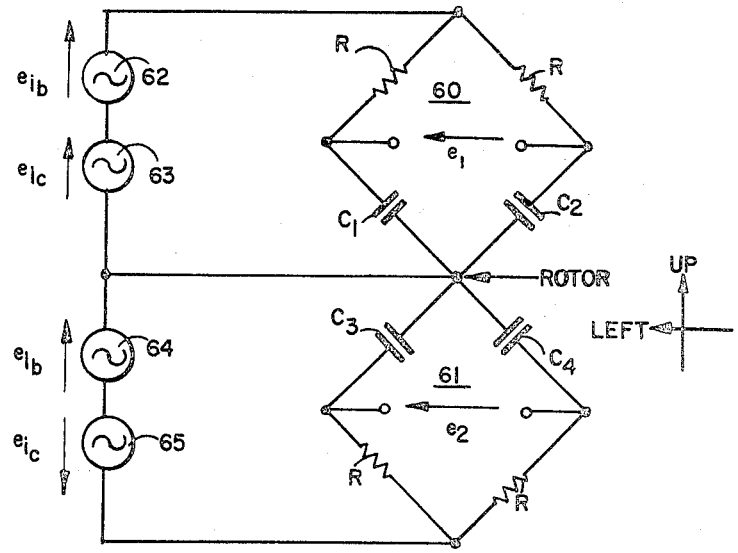
FIGURE 4 shows the equivalent bridge circuit for the balanced transformers used in the embodiment of FIGURE 1.

Another approach toward explaining the operation of balanced transformers 30 and 31 is possible. With reference to FIGURE 4, there is shown an equivalent circuit for balanced transformers 30 and 31 which looks like two adjacent bridge circuits 60 and 61. The equivalent voltage generators have exceedingly high outputs and the precision matched resistors R have a correspondingly high ohmic value so that the bridge currents are independent of capacitive load changes over a nominal range. Resistors R and generators 62, 63, 64 and 65 replace, in FIGURE 4, transformer 25 and the center tapped primaries 28 and 29 of transformers 30 and 31. The differential voltages $e_1$ and $e_2$ are the result of the secondaries 36 and 39 of transformers 30 and 31. To obtain $e_p$ which equals $e_1+e_2$, transformer 38 is replaced by a differential amplifier which is not shown.

When rotor 13 is in the center position, as in FIGURE 3a, each of capacitors $C_1$, $C_2$, $C_3$ and $C_4$ have the same value and $e_1$ and $e_2$ are zero. If rotor 13 moves up from center in the positive $z$ direction as is the case in FIGURE 3b, capacitors $C_1$ and $C_2$ in bridge 60 both increase to some new value. However, bridge 60 is still in balance and $e_1$ remains equal to zero. In bridge 61, capacitors $C_3$ and $C_4$ decrease but remain equal so that $e_2$ remains equal to zero. Thus, the dual bridge output, $e_p=e_1+e_2$, is independent of up-down motion.

If rotor 13 moves to the right in the positive $x$ direction as is the case in FIGURE 3c, capacitors $C_2$ and $C_4$ increase in value with a corresponding decrease in the capacitance of capacitors $C_1$ and $C_3$. Now both bridges 60 and 61 are unbalanced and $e_1$ and $e_2$ both have some value which when added together provides a position pickoff signal which is proportional to rotor 13 displacement.

It should be noted that with rotor motion out of the plane of the diagram, in FIGURES 3a–3c or FIGURE 4, each of capacitors $C_1$, $C_2$, $C_3$ and $C_4$ decrease in value equally and simultaneously leaving bridges 61 and 62 balanced. Thus, the pickoff is sensitive only to motion along a specific axis.

Examining the effects of the control voltages from generators 63 and 65, the currents in the upper capacitors $C_1$ and $C_2$ are increased while those in the lower capacitors $C_3$ and $C_4$ are decreased. Thus, a net upward electrostatic force is generated and control of rotor position and velocity is experienced. For a given bridge unbalance, $e_1$ is increased by the presence of $e_{i_b}$ but $e_2$ is decreased by the same amount that $e_1$ increased. Since $e_p$ is the sum of the two bridge outputs, it is independent of $e_{i_b}$.

Referring to FIGURE 2 again, it can be seen that the position pickoff signal $e_p$ derived from winding 40 is proportional to displacement along the $x$ axis. Therefore, the signal from winding 40 will be applied to the control current winding in the $x$ axis channel. As shown in FIGURE 1, the output of winding 40 is applied via electronic circuit 42 to the input winding 41' of transformer 25' in the $x$ channel to provide a control current signal to be added to the signal from constant current generator 21 to force rotor 13 in such a manner so as to cancel the output of winding 40 in the $z$ channel. Similar electronics 42' and 42" are provided for the $x$ and $y$ axes.

Figure 5:
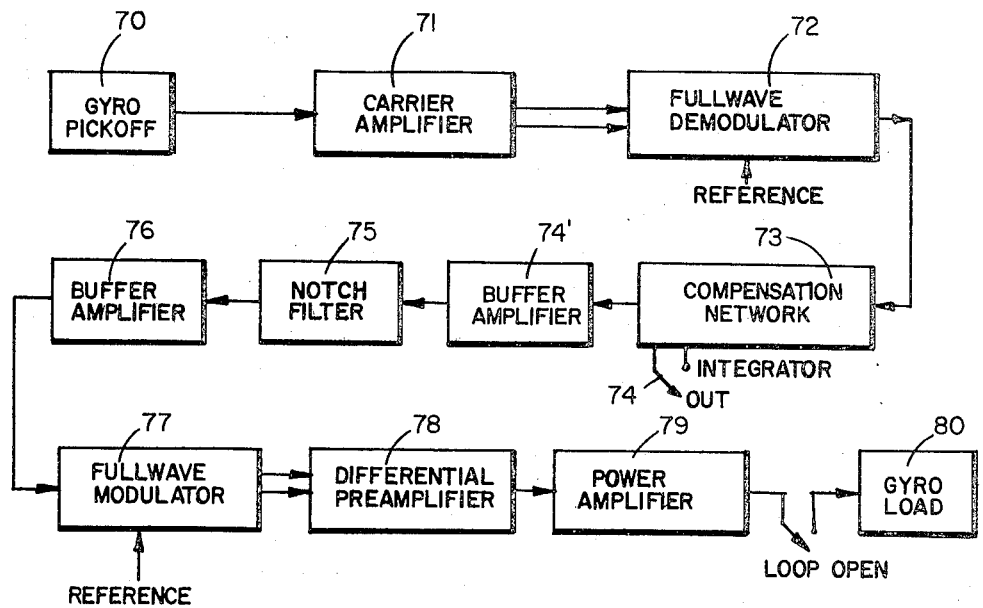
FIGURE 5 shows a functional block diagram of the electronics used in the embodiment of FIGURE 1.

Referring now to FIGURE 5, there is shown a functional block diagram of the electronics used with the present invention. In FIGURE 5, a block 70 labelled gyro pickoff represents the position pickoff output signal, $e_p$, from windings 40, 40', or 40". This signal is a double sideband, suppressed carrier modulated signal which is the product of the carrier signal due to source 20 and the modulating signal due to the displacement of rotor 13. The signal from gyro pickoff 70 is applied to a carrier amplifier 71 which provides gain and whose bandpass is centered at the carrier frequency of source 20. The output of amplifier 71 is applied to a full wave demodulator 72 which may be a full wave series chopper demodulator provided with a reference signal from the appropriate axis, to be explained more fully hereinafter. Full wave demodulator 72 is operative to multiply the input signal by a signal whose frequency is equal to the carrier frequency. Since the input signal also includes a term whose frequency is equal to the carrier frequency, the output of full wave demodulator 72 includes, by operation of the familiar trigonometric identity, a term at twice the carrier frequency. The output of full wave demodulator 72 is applied to a compensation network 73 which has an optional switch input 74. Compensation network 73 is operative to provide at its output a signal proportional to the input modulating signal which signal is a function of the position of rotor 13. Compensation network 73 is also operative to differentiate the position input signal so as to provide at its output a signal proportional to the velocity of rotor 13. Compensation network 73 also has an optional integrator circuit which is operated by opening or closing switch 74 so as to provide at its output a signal proportional to the integral of the position input signal to increase static stiffness. The output of compensation network 73 is applied to a buffer amplifier 74' for providing an impedance transformation before the signal from network 73 is applied to notch filter 75. Filter 75 is centered at a frequency equal to twice the carrier frequency so as to eliminate the signal at twice the carrier frequency generated in full wave demodulator 72. The output of notch filter 75 is applied via a second buffer amplifier 76 which also provides impedance matching to a full wave modulator 77. The output of buffer amplifier 76 is essentially a D.C. signal which is proportional to the position and velocity of rotor 13. This D.C. signal is modulated by modulator 77 on a carrier frequency whose phase is that of the axis being forced, as will be explained more fully hereinafter. The output of full wave modulator 77 is applied to a differential preamplifier 78 to complete the full wave modulation process. The output of preamplifier 78 is applied to a power amplifier 79 and then to the gyro load 80. Gyro load 80 represents the input windings 41, 41' or 41" of balanced transformers 25, 25' or 25", respectively.

Figure 6:
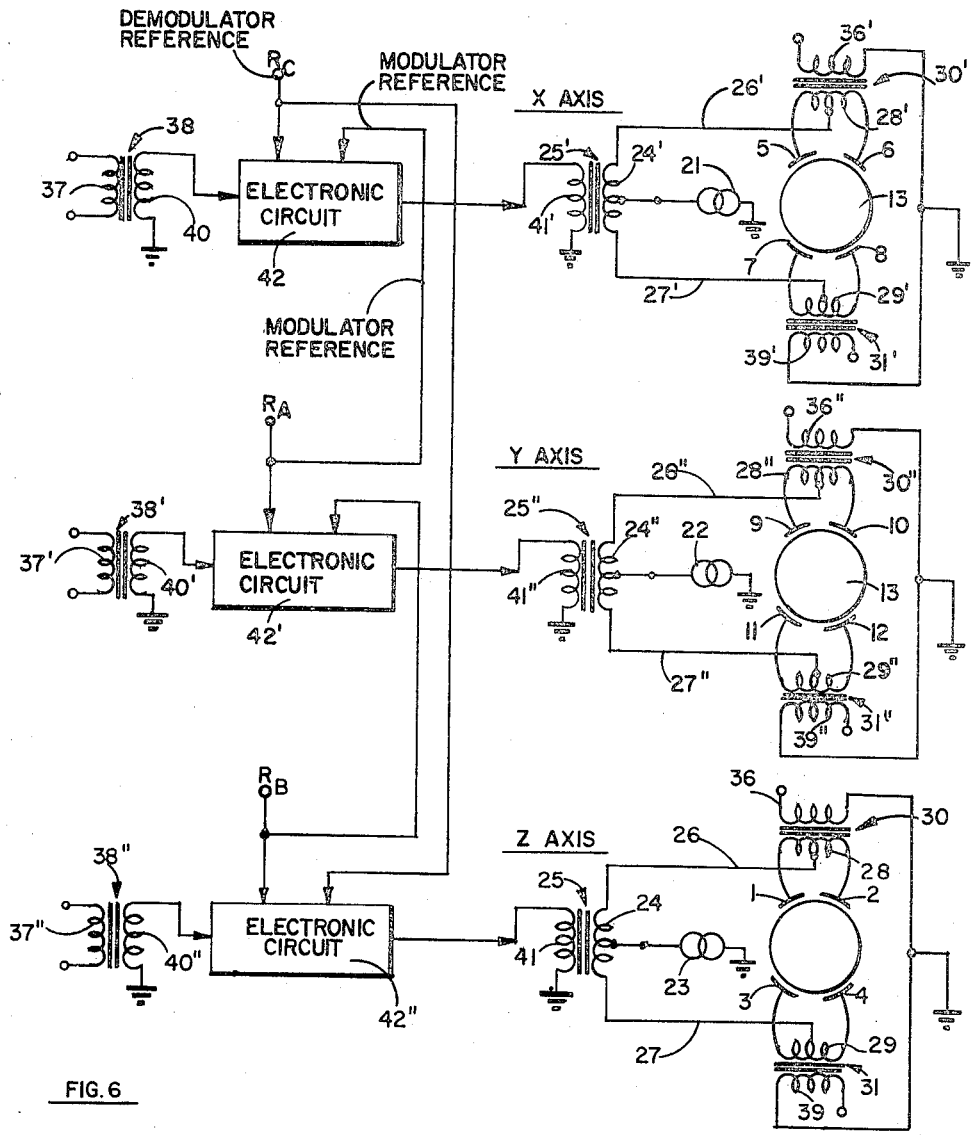
FIGURE 6 shows the relationship between the reference signals used in the electronic circuits for the three axes.

Referring now to FIGURE 6, there is shown the interrelationship between the electronic circuits 42, 42' and 42" and the manner in which the reference signals are derived for the full wave demodulators 72 and the full wave modulators 77. For convenience, the phase of the demodulator reference for electronic circuit 42' in the $y$ axis channel is denoted $R_A$, the phase of the demodulator reference for electronic circuit 42" in the $z$ axis channel is denoted $R_B$ and the phase of the demodulator reference for electronic circuit 42 in the $x$ axis channel is denoted $R_C$. The phases of references $R_A$, $R_B$, and $R_C$ are determined by the phases of current generators 21, 22 and 23. In other words, since the input signal to electronic circuit 42' to control the position of rotor 13 along the $y$ axis is derived from plates 5–8 along the $x$ axis, reference $R_A$ for demodulating this signal must be in phase with the current source for the $x$ axis. In other words, $R_A$ must be in phase with the current signal for generator 21. Similarly, since the input signal to electronic circuit 42" to control the position of rotor 13 along the $z$ axis is derived from plates 9–12 along the $y$ axis, reference $R_B$ for demodulating this signal must be in phase with current generator 22 which drives the $y$ axis. Finally, since the input signal to electronic circuit 42 to control the position of rotor 13 along the $x$ axis is derived from plates 1–4 along the $z$ axis, reference $R_C$ for demodulating this signal must be in phase with current generator 23 which drives the $z$ axis.

The reference signals for full wave modulators 77 in electronic circuits 42, 42' and 42" are chosen on the basis of providing each of the electronic circuits with a carrier phase which is proportional to the axis being forced. In other words, since electronic circuit 42 receives a control signal which is proportional to the displacement of rotor 13 along the $x$ axis and applies a forcing signal to the $x$ axis plates, electronic circuit 42 receives, as its modulator reference, the reference signal $R_A$ which is in phase with the current from generator 21 in the $x$ axis channel. Similarly, since electronic circuit 42' receives a control signal which is proportional to the displacement of rotor 13 along the $y$ axis and applies a forcing signal to the $y$ axis plates, electronic circuit 42' receives, as its modulator reference, the reference signal $R_B$ which is in phase with the current from generator 22 in the $y$ axis channel. Finally, since electronic circuit 42" receives a control signal which is proportional to the displacement of rotor 13 along the $z$ axis and applies a forcing signal to the $z$ axis plates, electronic circuit 42" receives, as its modulator reference, the reference signal $R_C$ which is in phase with the current from generator 23 in the $z$ axis channel.

While the invention has been described with respect to a preferred physical embodiment constructed in accordance therewith, it will be apparent to those skilled in the art that various modifications and improvements may be made without departing from the scope and spirit of the invention. For example, although three $y$-connected constant current sources have been shown as the carrier generator, it should be understood that such is not necessary but is preferred so that the position pickoff signal varies linearly as a function of rotor motion. Other voltage or current sources could be used as the carrier generator to establish a potential between each plate and the rotor. In addition, although a pair of balanced transformers have been shown for each axis for rotor position pickoff, control current injection and constant bias current feed, it will be apparent to those skilled in the art that other, equivalent, electronic circuits could be used instead.

We claim:
1. A control system for electrostatically supporting an electrically conductive member comprising:
two pairs of plates positioned on opposite sides of said member along a given axis, the plates of each pair being symmetrical with respect to each other about a plane including said given axis;
means for establishing a potential between said plates and said member so as to electrostatically support said member along said given axis; and
means responsive to the potential difference between the plates of each pair for providing a signal which varies as a function of the position of said member in a direction normal to said plane.
2. The control system of claim 1 further comprising:
an additional two pairs of plates positioned on opposite sides of said member along said normal direction;
means for establishing a potential between said additional plates and said member so as to electrostatically support said member along said normal direction; and
means responsive to said position varying signal for altering said potential between said additional plates and said member so as to control the position of said member in said normal direction as a function of said signal.
3. A control system for electrostatically supporting an electrically conductive member along three mutually perpendicular axes intersecting at the center thereof, comprising:
a plurality of pairs of plates symmetrically arranged around said conductive member with two pairs of plates arranged along each of said axes and on opposite sides of said member, the plates of each pair being symmetrical with respect to each other about a plane including their respective axes;
means for providing a current to each of said plates so as to electrostatically support said member in space; and
means responsive to the potential difference between the plates of each pair for providing a signal which varies as a function of the position of said member.
4. The control system of claim 3 further comprising:
means responsive to said position varying signal for altering said current to said plates as a function of said signal.
5. A control system for electrostatically supporting an electrically conductive member with respect to first, second and third mutually perpendicular axes intersecting at the center of said member, comprising:
first and second pairs of plates positioned on opposite sides of said member, the plates of each pair being symmetrical with respect to each other about a plane defined by said first and second axes, each of said plates being symmetrical about a plane defined by said first and third axes;
means for providing a current to each plate of said pairs of plates so as to electrostically support said member along said first axis; and
means responsive to the potential difference between the plates of each pair for providing a signal which varies as a function of the position of said member along said third axis.

6. The control system of claim 5 wherein said means for providing a current to each plate comprises:
a current generator for providing a substantially constant and equal current to each of said plates whereby said signal varies linearly as a function of the position of said member along said third axis.

7. The control system of claim 5 wherein said means for providing a current to each plate comprises:
first and second balanced transformers each having a center-tapped primary winding, each of the primary windings of said first and second balanced transformers being connected between the plates of a different one of said pairs of plates; and
means for providing a current to the center-tap of said primary winding so that an equal current is applied to each of said plates of each pair.

8. The control system of claim 7 wherein each of said first and second balanced transformers also has a secondary winding and wherein said means for providing a signal which varies as a function of the position of said member comprises:
means for differentially combining the outputs of the secondary windings of said balanced transformers.

9. The control system of claim 5 wherein said means for providing a current to each plate comprises:
first and second balanced transformers each having a center-tapped primary winding and a secondary winding, each of said primary windings being connected between the plates of a different one of said pairs of plates; and
means for providing a current to the center-tap of said primary windings, and wherein said means for providing a signal which varies as a function of the position of said member comprises:
a third balanced transformer having a primary winding and a secondary winding, the primary winding of said third transformer being connected between the secondary windings of said first and second transformers so as to differentially combine the outputs therefrom, the secondary winding of said third transformer providing said signal.

10. The control system of claim 5 wherein said means for providing a current to each plate comprises:
first, second and third balanced transformers each having a center-tapped primary winding, the primary windings of said first and second balanced transformers being connected between the plates of a different one of said pairs of plates, the primary winding of said third balanced transformer being connected between the center-taps of the primary windings of said first and second transformers; and
means for providing a current to the center-tap of the primary winding of said third transformer.

11. The control system of claim 5 wherein said means for providing a current to each plate comprises:
first, second and third balanced transformers each having a center-tapped primary winding and a secondary winding, the primary windings of said first and second balanced transformers being connected between the plates of a different one of said pairs of plates, the primary winding of said third balanced transformer being connected between the center-taps of the primary windings of said first and second balanced transformers; and
means for providing a current to the center-tap of the primary winding of said third transformer, the secondary winding of said third balanced transformer adapted to receive a control current so as to control the position of said member along said first axis, and wherein said means for providing a signal which varies as a function of the position of said member comprises:

a fourth balanced transformer having a primary winding and a secondary winding, the primary winding of said fourth balanced transformer being connected between the secondary windings of said first and second balanced transformers so as to differentially combine the outputs therefrom, the secondary winding of said fourth balanced transformer providing said signal.

12. The control system of claim 5 further comprising:
third and fourth pairs of plates positioned on opposite sides of said member, the plates of each pair being symmetrical with respect to each other about a plane defined by said first and third axes, each of said plates being symmetrical about a plane defined by said second and third axes;
means for providing a current to each plate of said third and fourth pairs of plates so as to support said member along said third axis; and
means responsive to said position varying signal for altering said current to said third and fourth pairs of plates so as to control the position of said member along said third axis as a function of said signal.

13. The control system of claim 12 further comprising:
means responsive to the potential difference between the plates of said third and fourth pairs for providing a second signal which varies as a function of the position of said member along said second axis;
fifth and sixth pairs of plates positioned on opposite sides of said member, the plates of each pair being symmetrical with respect to each other about a plane defined by said second and third axes, each of said plates being symmetrical about a plane defined by said first and second axes;
means for providing a current to each plate of said fifth and sixth pairs of plates so as to support said member along said second axis; and
means responsive to said second signal for altering said current to said fifth and sixth pairs of plates so as to control the position of said member along said second axis as a function of said second signal.

14. The control system of claim 13 further comprising:
means responsive to the potential difference between the plates of said fifth and sixth pairs for providing a third signal which varies as a function of the position of said member along said first axis; and
means responsive to said third signal for altering said current to said first and second pairs of plates so as to control the position of said member along said first axis as a function of said third signal.

15. The control system of claim 14 wherein said means for providing a current to each plate comprises:
a current generator for providing a substantially constant and equal current to each of said plates whereby said first mentioned signal and said second and third signals vary linearly as a function of the position of said member along said third, second and first axes, respectively.

References Cited

UNITED STATES PATENTS

| | | | |
|---|---|---|---|
| 2,925,590 | 2/1960 | Boltinghouse et al. | 74—5.6 XR |
| 3,209,602 | 10/1965 | Biderman | 74—5.6 |
| 3,286,533 | 11/1966 | Towner | 74—5.6 |
| 3,295,379 | 1/1967 | Jensen et al. | 74—5.6 |
| 3,320,817 | 5/1967 | Iddings | 74—5.6 |

FRED C. MATTERN, JR., Primary Examiner

M. ANTONAKAS, Assistant Examiner

U.S. Cl. X.R.

74—5